Oct. 15, 1968         E. J. OTKEN         3,405,662
APPARATUS FOR MAKING CONFECTIONARY PRODUCTS
Original Filed Oct. 31, 1963                2 Sheets-Sheet 1

INVENTOR
EDWIN J. OTKEN
BY
HIS ATTORNEYS

Oct. 15, 1968  E. J. OTKEN  3,405,662
APPARATUS FOR MAKING CONFECTIONARY PRODUCTS
Original Filed Oct. 31, 1963  2 Sheets-Sheet 2
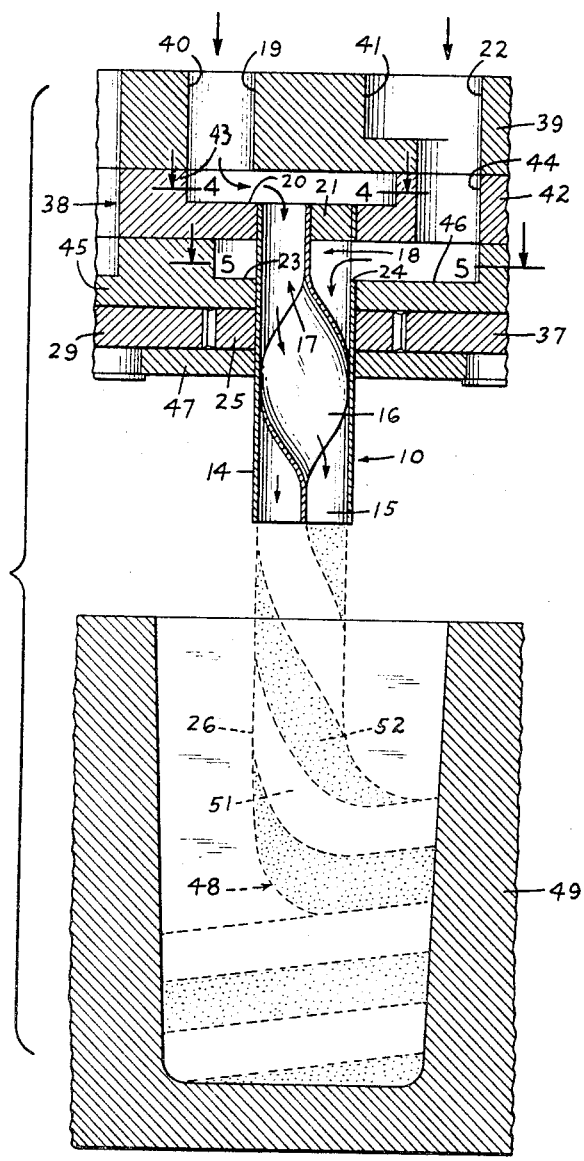
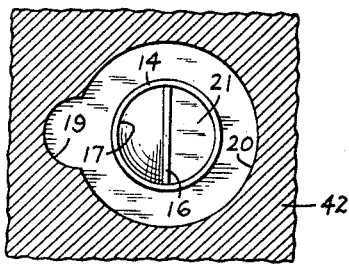
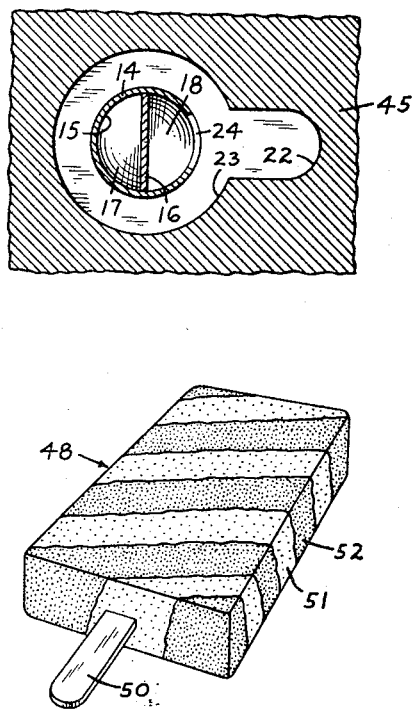
INVENTOR
EDWIN J. OTKEN
BY
HIS ATTORNEYS

# United States Patent Office 3,405,662
Patented Oct. 15, 1968

3,405,662
APPARATUS FOR MAKING CONFECTIONARY PRODUCTS
Edwin J. Otken, North Brunswick, N.J., assignor to Good Humor Corporation, Brooklyn, N.Y., a corporation of Delaware
Original application Oct. 31, 1963, Ser. No. 320,459. Divided and this application Jan. 11, 1967, Ser. No. 608,666
8 Claims. (Cl. 107—1)

ABSTRACT OF THE DISCLOSURE

This invention relates to a depositor for making frozen confections and including a rotary nozzle having a pair of passages therein for discharging differently colored and/or flavored confections in a plastic state into a mold in the form of generally helical layers.

---

This is a division of my U.S. application Ser. No. 320,459, filed Oct. 31, 1963, now abandoned.

Variegated or multiflavored ice cream confections have been produced heretofore by simultaneously extruding ice cream having different flavors through one or more nozzles into a mold or container. The different flavors may be deposited in separate layers or intermixed by suitable operation of the depositing apparatus. In the "ice cream on a stick" type of confection, the strips or cores of ice cream extend lengthwise of the confection and thus provide a sameness of appearance, except for color, to the multiflavor product confection.

According to the present invention, a frozen confectionary product having distinct arcuate or chevron-like transverse stripes of different frozen confections is provided. The appearance of the confection is reminiscent of the stripes that often characterize wild animals, such as the zebra and the tiger.

More particularly, in accorance with the invention a frozen confectionary product having a stick-type handle and a plurality of distinct strips of different frozen confections disposed generally transversely of the product is produced by means of a depositor having a rotating nozzle of novel type. The nozzle is a tubular member with a generally longitudinal passageway and at least one longitudinally disposed partition therein, twisted in the shape of a helix or the like, to provide at least two discrete channels within the tubular member. A first conduit, in free communication with one of the channels, and a second conduit in free communication with the other channel, and means, such as a rotary or reciprocating motor or the like, for rotating the nozzle and partition, permit at least two frozen confections to be extruded simultaneously and separately through the nozzle, and deposited therefrom in a conventional mold for freezing the confectionary product into the distinct striped array described.

For a better understanding of the present invention, reference may be had to the accompanying drawings in which:

FIGURE 3 is a view in vertical section on an enlarged scale and with parts broken away of a nozzle extruding a frozen confectionary product into a conventional freezing mold;

FIGURE 4 is a view in section taken along the line 4—4 of FIGURE 3 and looking in the direction of the arrows;

FIGURE 5 is a view in section taken along the line 5—5 of FIGURE 3; and

FIGURE 6 is a perspective view of a frozen confectionary product according to the invention.

Figure 1:
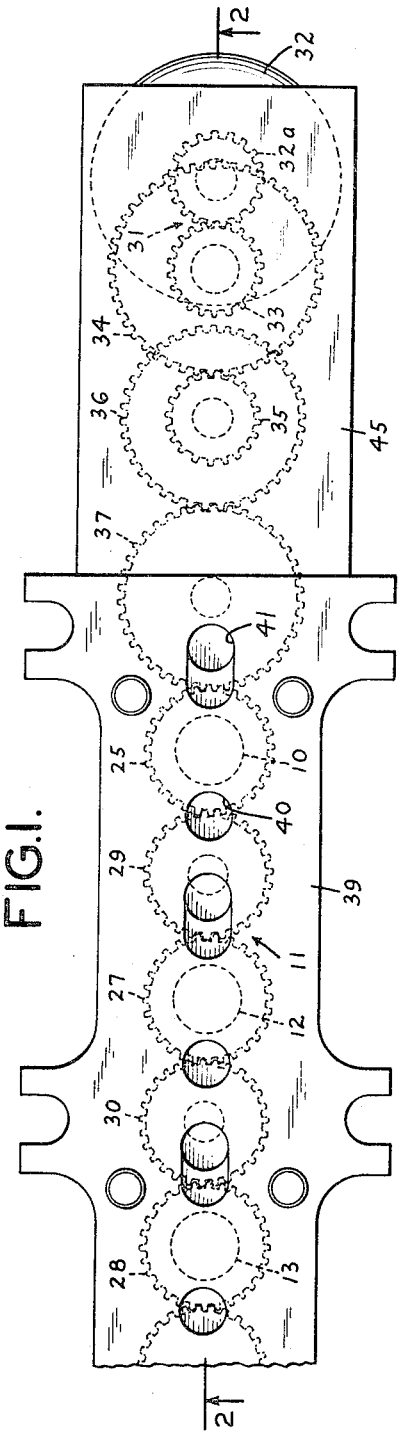
FIGURE 1 is a plan view of an array of nozzles embodying the invention with parts broken away.

A nozzle 10, according to the present invention, can be part of an array 11 of similar nozzles 12 and 13 (FIGURE 2), to satisfy mass production needs. Each nozzle 10 (FIGURE 3) includes a nozzle member 14, which may be of tubular shape, having a longitudinal passageway 15. A twisted partition 16, having, for example, a two and one-half full turn helical twist, is fixed, by welding or the like, to the interior tubular surface of the nozzle member 14, dividing the longitudinal passageway 15 into two discrete longitudinal channels 17 and 18.

A vertical conduit 19, and an associated reservoir 20, both disposed above the nozzle member 14 are in vertical communication with the channel 17. A thin semicircular plug 21 (FIGURE 4), interposed between the interior nozzle member wall forming the longitudinal passageway 15 and the twisted partition 16 defining the upper end of the channel 18, provides a barrier isolating the channel 18 from the reservoir 20 and conduit 19.

A vertical conduit 22, and an associated annular reservoir 23 (FIGURE 5) transversely circumscribing the nozzle member 14 near the upper end of the longitudinal passageway 15, are in free transverse communication with the channel 18 through a slot 24 formed in the nozzle member 14.

Means such as a gear 25 (FIGURE 2), fixed to the outer surface of the nozzle member 14, at the transverse midplane of the nozzle member 14 is provided to turn the nozzle member 14 during frozen confection extrusion to produce a column 26 of striped, extruded frozen confectionary product, as shown in FIGURE 3. Similarly arranged gears 27 and 28 (FIGURE 2) drive the nozzles 12 and 13, respectively. Idler gears 29 and 30 mesh with the gears 27 and 28 to drive the gears 27 and 28 at the same speed and in the same direction of rotation as the gear 25.

Figure 2:
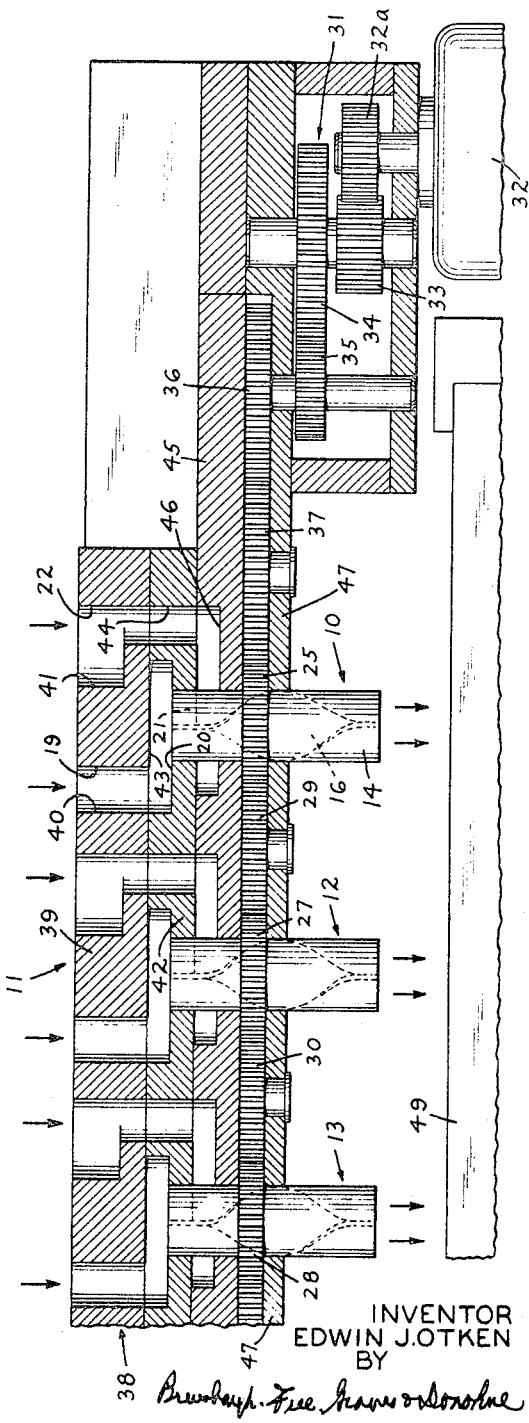
FIGURE 2 is a view in section taken along the line 2—2 of FIGURE 1 and looking in the direction of the arrows.

Driving power to turn the array of nozzles 11 can be provided by any suitable conventional means such as a pneumatic cylinder with a rack and pinion gear, or, as shown for example in FIGURES 1 and 2, a gear head motor 32 with a driven gear 32a. The driven gear 32a meshes with gear means 31 composed of a driven gear 33 that transfers the power input from the motor 32 to a conventional train of gears 34, 35, 36 and 37. The nozzles 10, 12 and 13 are thus driven at the same speed and in the same direction by the motor 32, the driven gear 32a, the gear means 31 and the gears 25, 27, 28, 29 and 30 in the manner hereinbefore described.

The conduits 19 and 22, reservoir 20 and the annular reservoir 23 are all formed in a set of vertically aligned stacked plates 38 held in alignment by press fitted dowels, or the like (FIGURES 2 and 3). The stacked plates 38 permit the nozzles to be taken apart completely for thorough cleansing with minimum difficulty. The gear means 31, gear head motor 32, the nozzle members 10, 12 and 13 and the idler gears 29 and 30 are also mounted in and rotatably supported within the vertically aligned stacked plates 38. Thus a distributing plate 39 (FIGURE 1), uppermost in the vertical stack of plates 38, is provided with sets of holes 40 and 41, which form, in part, the conduits 19 and 22, respectively. Immediately below the distributing plate 39 is an upper flow plate 42 (FIGURES 2 and 3) provided with pairs of recesses 43 and holes 44, which, in alignment with the holes 40 and 41 in the distributing plate 39, also form, in part, the conduits 19 and 22, while the recesses 43 also form the reservoir 20 for vertical communication between the channel 17 and the conduit 19.

A lower flow plate 45, immediately below and aligned with the upper flow plate 42, has a recess 46 which forms the annular reservoir 23, and a portion of the associated conduit 22 for transverse communication with the channel 18 through the slot 24 formed in the nozzle member 14 just below the semicircular plug 21 that seals the channel 18 from the reservoir 20.

A gear plate 47 (FIGURE 2) is disposed directly below the lower flow plate 45 and in general alignment therewith. The rack and pinion gear means 31, the idler gears 29 and 30 and the gears 25, 27 and 28 associated with the nozzles 10, 12 and 13 are all supported by the gear plate 47 for rotation thereon in the manner described.

A striped frozen confection 48 (FIGURES 3 and 6) is produced by extruding two different frozen confections in the plastic state through the nozzle 10, while the nozzle member 14 is being rotated about the longitudinal axis.

During frozen confection extrusion, the nozzle 10 can be plunged into the mold with the open end of the nozzle adjacent to the bottom of the mold and then withdrawn by any convenient means as the ice cream is extruded through the nozzle or, as shown in FIGURE 3, the two streams of ice cream issuing from the nozzle 10 can be deposited directly in the mold 49 in generally helical layers. The layers of ice cream thus deposited in the mold 49 extend across the bar in generally arcuate alternating bands 51 and 52 imparting a striped appearance to the confection.

As shown in FIGURE 6, a typical frozen confection 48 includes a stick 50 inserted in the confection 48 after the mold is filled, but before the ice cream has been hardened fully. The stripes 51 and 52 of different ice creams, ices and the like produce an unusual appearance not heretofore found in other known frozen confectionary products.

In operation (FIGURE 3), a frozen confectionary product 52, such as a conventional ice cream or sherbert, is extruded through conduit 19 and reservoir 20, into the channel 17 formed by the twisted partition 16 and the longitudinal passageway 15 in the nozzle member 14. A different frozen confection 51, which may be an ordinary ice cream or sherbert differing from the frozen confection 52 in flavor, color or both, is extruded through the conduit 22 and annular reservoir 23, into the slot 24 communicating with channel 18 in the nozzle member 14.

The gear means 31 and the gear head motor 32 driving the gear 25 in the manner hereinbefore described, rotates the nozzle member 14 and the twisted partition 16 therein while the frozen confections 51 and 52 are being extruded along the inclined sides of the partition 16 in the nozzle 10 and into the mold 49.

The frozen confections 51 and 52 deposited in the mold 49 are cooled from a plastic to a frozen state by any suitable method, such as immersing the mold 49 in a freezing brine solution. The stick 50, or means for manipulating the frozen confection 48 is inserted into the base of the striped frozen confection 48 before the confection 48 solidifies, and is frozen in the partially exposed position perpendicular to the base of the confection 48 as shown in FIGURE 6. The mold 49 and confection frozen therein are removed, after solidification, from the freezing brine solution and warmed, for example, by contacting the external shell of the mold 49 with a warm water bath to melt slightly the frozen confection 48 surfaces and thereby permit the frozen confection 48 to be withdrawn from the mold 49 for packaging, shipping, sale and consumption.

As is apparent from the foregoing, the present invention provides an apparatus for extruding a striped frozen confection and the unique product produced thereby.

While representative embodiments of the present invention have been shown and described for purposes of illustration, various changes and modifications may be made therein as pointed out above without departing from the principles of this invention. Therefore all such changes and modifications are included within the intended scope of the invention as defined by the following claims.

I claim:

1. A nozzle for extruding plastic material comprising a nozzle member having a generally longitudinal passageway, at least one twisted partition within the nozzle member forming a plurality of discrete channels therein, conduits each in free communication with one of the respective channels, and means for rotating the nozzle member and the twisted partition to produce a striped extruded product.

2. A nozzle for extruding plastic material comprising a nozzle member having a generally longitudinal tubular passageway, a twisted partition longitudinally disposed within the nozzle member and fixed therein to form two discrete longitudinal channels, a first conduit in free communication with one of the channels, a second conduit in free communication with the other channel, and means for rotating the nozzle member and the twisted partition therein to produce a striped extruded product.

3. A nozzle for extruding plastic material comprising a nozzle member having a generally longitudinal passageway, a twisted partition disposed longitudinally within the nozzle member passageway forming two discrete channels therein, a first conduit in free longitudinal communication with one of the channels, a second conduit in free transverse communication with the other channel, and means for simultaneously rotating the nozzle member and the twisted partition to produce a striped extruded product.

4. A nozzle for extruding plastic material according to claim 3 wherein said twisted partition has a helical shape.

5. A nozzle for extruding plastic material according to claim 3 wherein said twisted partition has a spiral shape.

6. A nozzle for extruding frozen confectionary products, comprising a generally tubular nozzle member having a longitudinal passageway, a longitudinally twisted partition fixed within the passageway forming two discrete channels therein, an annular reservoir circumscribing said tubular nozzle member in free transverse communication with one of the channels, conduit means operatively associated with said annular reservoir for extruding the frozen confectionary product therethrough, a reservoir in free longitudinal communication with the other channel for extruding the frozen confectionary product therethrough, and gear means for rotating the nozzle member to produce a striped extruded product.

7. A nozzle according to claim 6 wherein said gear means includes a gear head motor.

8. A nozzle for extruding frozen confectionary products, comprising a generally tubular nozzle member having a longitudinal passageway, a longitudinally twisted partition fixed within the passageway forming two discrete channels therein, a plurality of stacked distribution plates transversely engaging the longitudinal periphery of said tubular nozzle member, each of said plurality of stacked distribution plates having a pair of apertures substantially aligned with the respective apertures in the next adjoining distribution plate to form a pair of conduits, an annular reservoir in free transverse communication with one of said channels and one of said conduits for the extrusion of the frozen confectionary product therethrough, a reservoir in free longitudinal communication with the other conduit and the other channel for extruding the frozen confectionary product therethrough, and gear means for rotating the nozzle member to extrude a striped frozen confectionary product.

References Cited

UNITED STATES PATENTS

| Number | Date | Name | Class |
|---|---|---|---|
| 573,432 | 12/1896 | Megson | 107—52 |
| 2,463,112 | 3/1949 | Kipnis | 107—54 |
| 2,479,261 | 8/1949 | Reetz | 107—14 |
| 3,014,437 | 12/1961 | Dutchess | 107—1 |
| 3,347,287 | 10/1967 | Geber | 107—4 |

WALTER A. SCHEEL, *Primary Examiner.*

ARTHUR O. HENDERSON, *Assistant Examiner.*